United States Patent
Smith

(10) Patent No.: US 7,157,563 B2
(45) Date of Patent: Jan. 2, 2007

(54) ORGANIC SOLVENT SOLUBLE METAL COMPLEX AZO DYES

(75) Inventor: Michael J. Smith, Newtown, PA (US)

(73) Assignee: United Color Manufacturing, Inc., Newtown, PA (US)

(*) Notice: Subject to any disclaimer, the term of this patent is extended or adjusted under 35 U.S.C. 154(b) by 0 days.

(21) Appl. No.: 10/947,281

(22) Filed: Sep. 23, 2004

(65) Prior Publication Data

US 2005/0192431 A1    Sep. 1, 2005

Related U.S. Application Data

(60) Provisional application No. 60/504,984, filed on Sep. 23, 2003.

(51) Int. Cl.
*C09B 45/08* (2006.01)
*C09B 45/12* (2006.01)
(52) U.S. Cl. ............... 534/649; 534/693; 8/685
(58) Field of Classification Search ........ 534/649, 534/693; 8/685
See application file for complete search history.

(56) References Cited

U.S. PATENT DOCUMENTS 3,705,888 A * 12/1972 Lewis ............... 534/693

* cited by examiner

*Primary Examiner*—Fiona T. Powers
(74) *Attorney, Agent, or Firm*—Kelley Drye & Warren LLP

(57) ABSTRACT

The present invention relates to organic solvent soluble dyes. In particular, the invention relates to an organic solvent soluble metal complex azo dyes containing chelated metal atoms.

20 Claims, No Drawings

ORGANIC SOLVENT SOLUBLE METAL COMPLEX AZO DYES

CROSS-REFERENCE TO RELATED APPLICATIONS

The present invention relates to, and is entitled to the benefit of the earlier filing date and priority of, Application No. 60/504,984, filed on Sep. 23, 2003, which is herein incorporated by reference as if fully set forth.

FIELD OF THE INVENTION

The present invention relates to organic solvent soluble dyes. In particular, the invention relates to an organic solvent soluble metal complex azo dyes containing chelated copper or nickel atoms.

BACKGROUND

Metal complex azo compounds have been used for many years as organic solvent soluble dyes. A survey of the listings in the "Colour Index," a joint publication of the American Association of Textile Chemists and the Society of Dyers and Colourists (UK), reveals that with one exception all the dyes are chelates of chromium and, to a lesser extent, cobalt and iron. The sole exception appears to be the non ionic copper complex C.I. Solvent Black 49. As a consequence of these aforementioned metals being in the $3^+$ oxidation state, the dye chromophore is an anion accompanied by a cation derived from one of the alkali metals like sodium or, more frequently, an organically substituted ammonium ion. Because of their ionic nature, most of these dyes have a finite solubility in the lower alcohols, glycol ethers, ketones and esters and similar materials and generally lack significant solubility in aromatic or even more aliphatic hydrocarbons. These dyes also frequently bear sulfonic acid groups which usually limits their solubility in the less polar organic solvents even further. The dyes of the present invention are non-ionic and free from sulfonic acid groups.

It is therefore an advantage of some, but not necessarily all, embodiments of the present invention to provide a dye lacking sulfonic acid groups that have an unusually broad spectrum of organic solvent solubility, and may also be converted into stable aqueous dispersions with or without the assistance of conventional chemical dispersing agents.

Additional advantages of various embodiments of the invention are set forth, in part, in the description that follows and, in part, will be apparent to one of ordinary skill in the art from the description and/or from the practice of the invention.

SUMMARY OF THE INVENTION

An embodiment of the present invention is a dye composition comprising a dye represented by the formula:

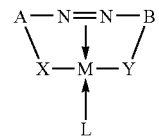

wherein A and B are one or more aromatic moieties bonded by one or more azo and hydroazo groups; M is a metal atom in a $2^+$ oxidation state; L is one or more water soluble primary and/or secondary aliphatic amines; and X and Y are independently one or more oxygen and/or nitrogen. The the aromatic moieties may be selected from the group consisting of carbocylic and heterocyclic moieties. The dye composition may be soluble in an organic solvent. The dye composition may comprise an ionic or a non-ionic metal complexed azo dye, the metal may be selected from, but is not limited to copper and/or nickel. The organic solvent may be selected from, but is not limited to, the group consisting of aliphatic hydrocarbons and lower alcohols.

One or more of A or B may be further substituted by a hydrocarbon chain containing from about 7 to about 24 carbon atoms, or may further comprise one or more hydrocarbon chains containing at least 6 carbon atoms. One or more of A or B may be further substituted by a group selected from the group consisting of halogen, nitro, carbalkoxy, arylazo, sulfonamide, and substituted sulfonamide. L may be hydrophilic or hydrophobic. L may be selected from the group consisting of di-, tri-, and tetra-glycol amines, hydroxy ethoxy propylamines, ethylene amines, diethanolamine, glycol amines and more extensively ethoxylated homologues, hydroxyalkoxy propylamines, NN-dimethyl, diethyl amino propylamine, and NNNN-tetramethyl ethylene diamine. One or more of X and Y may be nitrogen and the nitrogen may be further substituted by an alkyl or aryl group.

Another embodiment of the present invention comprises a dye composition comprising a dye represented by the formula:

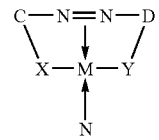

wherein C and D are one or more aromatic moieties bonded by one or more azo and hydroazo group and wherein one or more of C and D is substituted by a hydrophilic chain; M is a metal atom in a $2^+$ oxidation state; N is one or more water insoluble primary and/or secondary aliphatic amines; and X and Y are independently one or more oxygen and/or nitrogen. The hydrophilic chain may derived from a water soluble primary or secondary aliphatic amine or the condensation product of an aliphatic amine and ethylene oxide. One or more of C and D may further comprise other substituents selected from the group consisting of, but not limited to, halogen, nitro, carbalkoxy, arylazo, sulfonamide and substituted sulfonamides. N may comprise from about 7 to about 18 carbon atoms.

Another embodiment of the present invention is a dye composition represented by the formula:

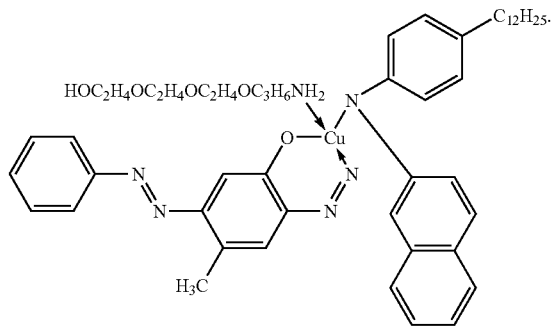

The dye composition may comprise about 10% to about 80% of a compatible solvent. The solvent may be selected from, but is not limited to the group consisting of n-propanol, 2-butanone, toluene, phenol glycol ether, benzyl alcohol, and ethyl acetate.

Another embodiment of the present invention is a dye composition comprising a copper or nickel complexed azo compound, having the general characteristics of a non-ionic surfactant. That is to say one part of the molecule bears a covalently bonded hydrophobic or lipophilic alkyl chain comprised of at least 7 carbon atoms, while another part of the same molecule bears a hydrophilic or lipophobic substituent.

DETAILED DESCRIPTION OF EMBODIMENTS OF THE INVENTION

The present invention provides an organic solvent soluble non-ionic copper or nickel complexed azo dye having an increased spectrum of solvent solubility and compatibility. In some embodiments, the dyes of the present invention have a very broad spectrum of solvent solubility ranging from aliphatic hydrocarbons to the lower alcohols, depending upon the individual chemical constitution. In other embodiments, the dyes are miscible in many proportions with most organic solvents and are extremely resistant to crystallization or formation of solid deposits when they are incorporated, for instance, into an ink. Embodiments of the dyes of the present invention in their unsolvated state are viscous liquids or tars that are generally inconvenient to handle. It is contemplated that they will usually be supplied as stable mobile concentrates in an appropriate solvent. The solvent may be partly, or even wholly, replaced by a dispersant or surfactant, or other suitable material so that the dye can be converted into a stable aqueous dispersion.

The broad spectrum of solubility characteristic of the embodiments of the dyes of the present invention is consequent upon their being designed like a non-ionic surfactant by incorporating into the molecule a hydrophobic hydrocarbon chain containing 7 to 20, and in some embodiments 12, carbon atoms. Two or more hydrocarbon chains may be present where one may contain at least six carbon atoms.

Embodiments of the present invention also contain a hydrophilic moiety which may be supplied by a primary or secondary aliphatic amino alcohol. Considering readily available industrial organic chemicals, this part of the molecule may be attached to the rest of the structure by the amine function acting as a ligand to the copper or nickel atom. In some embodiments, the preferred ligands are di-, tri-, and tetra-glycol amines, hydroxy ethoxy propylamines, or ethylene amines, or any other suitable amine. However, the converse configuration in which the hydrophilic part of the molecule is part of the organic azo structure and the hydrophobic function is provided by an aliphatic amine acting as a ligand to the copper atom is also effective.

The structure of the dyes according to embodiments of the present invention may be symbolized as:

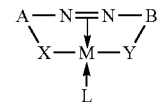

where A and B are aromatic moieties bonded by an azo or hydrazo group obtained by conventional azo synthesis procedures. Both A and B bear atoms X and Y immediately adjacent to the azo bond which are covalently bonded to a metal atom M in the 2$^+$ oxidation state. In further embodiments of the present invention, the metals may be, but are not limited to, copper or nickel. Additionally, one of the nitrogen atoms of the azo bond acts as an electron donor to the metal atom. In still other embodiments, the atoms X and Y may be oxygen or nitrogen. In the latter case, the nitrogen atom may be further substituted by an alkyl or aryl group or form part of the heterocyclic ring structure.

In yet another embodiment, at least one of A or B is substituted by an hydrocarbon chain containing seven to twenty-four, and in some instances about twelve, carbon atoms. The total number of carbon atoms may be present in one, or more than one, constituent. Both A and B may also bear other substituents that do not impart significant water solubility to the molecule such as halogen, nitro, carbalkoxy, sulfonamide or substituted sulfonamide groups. Another substituent may be an arylazo group which may or may not be involved in the chelation of another copper or nickel atom.

L is a water-soluble primary or secondary aliphatic amine where the nitrogen atom functions as a ligand for the aforementioned metal atom. Suitable compounds include diethanolamine, glycol amines and more extensively ethoxylated homologues, and hydroxyalkoxy propylamines and ethylene amines.

Other useful ligands include NN-dimethyl or diethyl amino propylamine and NNNN-tetramethyl ethylene diamine. The hydrophobic and hydrophilic balance in a particular application will dictate, in some instances, the particular amine ligand used.

Alternative embodiments of the invention are illustrated as:

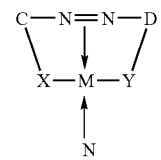

where C and D are aromatic moieties bonded by an azo or hydrazo group obtained by conventional azo synthesis procedures. Both C and D bear atoms X and Y immediately adjacent to the azo bond which are covalently adjacent to a metal atom M in the $2^+$ oxidation state. In some embodiments, the metals may be, but are not limited to, copper or nickel. Additionally, one of the nitrogen atoms of the azo bond acts as an electron donor to the metal atom. The atoms X and Y may be, but not limited to, oxygen or nitrogen. In the latter case, the nitrogen atom may be further substituted by an alkyl or aryl group or form part of the heterocyclic ring structure.

At least one of C or D is substituted by a hydrophilic chain which is derived from a totally water soluble primary or secondary aliphatic amine or the condensation product of an aliphatic amine and ethylene oxide. Both C and D may also bear other substituents that do not impart significant water solubility to the molecule such as halogen, nitro, carbalkoxy, sulfonamide or substituted sulfonamide groups. Another substituent may be an arylazo group which may or may not be involved in the chelation of another metal atom.

N is a water insoluble primary or secondary aliphatic amine where the nitrogen atom functions as a ligand for the copper or nickel atom. Suitable compounds include aliphatic amines with seven or more, and in some embodiments, twelve to eighteen, carbon atoms. The hydrophobic and hydrophilic balance in a particular application will dictate, in some instances, the particular amine ligand used.

The following examples serve to illustrate, but do not limit, the scope of the invention:

EXAMPLE 1

To a solution of 15 grams of sodium nitrite in 60 mL of water, 28 grams of technical grade (0.2 mole) 4-nitroaniline is added and agitated until a uniform slurry is obtained. The slurry is then added over about five minutes to 60 grams of hydrochloric acid 32% that has been cooled by the addition of ice to $-5°$ C. Additional ice is supplied to the system to prevent the temperature rising above $5°$ C. during the slurry addition. The mixture is then stirred for about 15 minutes until it becomes as clear as possible. While still maintaining its temperature below $5°$ C., a small amount of filter aid is now added and the solution of 4-nitrobenzene diazonium chloride filtered. The filtered solution is then transferred to a stirred beaker or flask and any excess nitrite ion is reduced with sulfamic acid. Next, a solution of 32 grams of 2,5 dimethoxy aniline dissolved in 200 mL water with 25 grams of hydrochloric acid 32% is added over fifteen minutes by dropping funnel. Azo coupling starts immediately with the formation of a thick brown suspension. At the end of the addition of the 2,5 dimethoxy aniline solution, a sufficient volume of a 30% aqueous solution of sodium acetate is added to raise and stabilize the pH at 3. The coupling, which is held at $5-10°$ C. with the addition of ice, proceeds rapidly as monitored by the disappearance of the diazo reaction to alkaline H acid.

The slurry of aminoazo dye now has an additional 25 grams of hydrochloric acid 32% added to it, followed by the slow addition of 15 grams of sodium nitrite dissolved in 60 mL water, during which process the temperature may be allowed to rise to $20-25°$ C. The mixture is stirred for 30 minutes following the nitrite addition to complete the diazotization process after which any excess nitrite ion is reduced by the addition of a small amount of sulfamic acid.

Next, an xylene solution containing 0.2 moles of 3 hydroxy 4' dodecyl diphenylamine is prepared and added to the diazo. The diazo transfers rapidly from the aqueous to the organic phase where azo coupling is essentially instant. When all the brown diazo has disappeared from the aqueous phase the pH of the system is raised to a pH of about 5 by the addition of a sodium hydroxide solution and the system heated to $80°$ C. Agitation is then stopped and the mixture allowed to separate into two phases. The lower aqueous one is discarded and the upper organic phase transferred to a heated, stirred flask equipped for distillation. To the flask, 0.2 gram atoms of copper is added in the form of basic cupric carbonate followed by 0.22 gram moles of diethanolamine. The flask contents are now heated to $140°$ C. and any evolved water distilled out. The cuprification process is monitored by thin layer chromatography ("TLC") during which the conversion of the intermediate dull purple dye to its blue-black copper complex is observed.

When the reaction is complete, the reaction mixture is cooled and filtered. The filtered dye may then be cooled and standardized to color strength by the addition of xylene or it may be put into a clean flask and all the xylene removed by heating to $140°$ C. under a vacuum. The final weight of the thick tarry dried dye is measured, after which it can be diluted to a 60% or even 70% solution in, but not limited to, ethyl alcohol, n-propanol, methyl ethyl ketone, ethyl acetate, or toluene. All of these concentrates will be found to be resistant to crystallization even after prolonged storage at $-25°$ C. A 5% solution of one of these concentrates diluted with the same solvent and then applied to white bond paper will, after drying, leave an intense bluish-black film with excellent lightfastness and no bleed into water even upon prolonged submersion.

EXAMPLE 2

A 5 liter flask surrounded by an ice bath is charged with 300 grams of ice and 50 grams of water. The mixture is stirred and 130 grams of sulfuric acid 96% is added, followed by 100 grams of aniline, and a white dispersion of aniline sulfate is formed. The mixture is then cooled by ice addition to $-5°$ C. and diazotized below $3°$ C. by the addition of 190 grams of a 40% aqueous sodium nitrite solution. The mixture is stirred until all white specks of aniline sulfate have dissolved into a clear solution. After an approximate five minute stir, unreacted nitrite ion is eliminated by the addition of small amounts of sulfamic acid. To the diazo, 140 grams of 2 methoxy 5 methylaniline is added, while the temperature is allowed to rise to $5-10°$ C. After 15 minutes of stirring, a sufficient volume of a 30% solution of sodium acetate is added to raise the pH of the reaction to 3.5. The reaction is stirred for 4 hours at $10-12°$ C. allowing for the essentially complete azo coupling. Next, 600 grams of xylene is now added followed by 110 grams of concentrated sulfuric acid. After a few minutes of stirring, the aminoazo compound is diazotized at $20-25°$ C. by the addition of 200 grams of a 40% sodium nitrite solution. A positive test for nitrite is maintained for 10 minutes then eliminated with sulfamic acid.

The diazo will be a uniform brown solution in which most of the xylene is emulsified. To the diazo, an 80% solution of 2(4' dodecylphenyl)amino naphthalene with an azo coupling equivalent of 1.1 moles is added. The diazo transfers rapidly from an aqueous to an upper organic phase with the formation of a deep bluish-purple dye. To the solution, 30 grams of a 28% aqueous ammonia solution are added followed by about 350 grams of a 50% sodium hydroxide solution to raise the pH of the system to 7.5. The system is now heated to $80°$ C. when the agitation is stopped and the reaction mixture is allowed to separate into two phases. The lower aqueous phase is removed and discarded. To the dye phase, one gram atom of copper in the form of cupric hydrate is added followed by 40 grams of 2 ethylhexoic acid and 200 grams of diethylene glycol 3 aminopropyl ether. The mixture is heated with agitation and, as in Example 1, the progress of the cuprification is monitored by TLC. When the reaction is complete, the dye is filtered and color standardized with xylene to make approximately 1800 grams of product. Otherwise the xylene is stripped off under vacuum, when it may be replaced by, but not limited to, n-propanol, 2 butanone, ethyl acetate, or phenoxyethanol to form freeze stable fluid concentrates. When diluted with solvent and dried on paper, the dye produced a slightly violet black film reminiscent of the shade of the azine dye Nigrosine.

EXAMPLE 3

The Example 2 synthesis is repeated except that the 165 grams of diethylene glycol 3 amino propyl ether is replaced by 220 grams of 1,propanamine,33'-[oxybis(2,1 ethanedyloxy)]bis. The resultant dye has very similar properties to the dye of Example 2 except for being noticeably bluer in shade.

EXAMPLE 4

The synthesis of Example 2 is repeated, except that the diethylene glycol 3 amino propyl ether is replaced by 100 grams of triethylene tetramine. Again, the final dye is similar to but somewhat bluer in shade than Example 1.

EXAMPLE 5

52 grams of 3 amino benzotrifluoride is mixed with 50 grams of 2 methyl 2 butanol and 200 mls of water are added, followed by 38 grams of sulfuric acid 96%. The mixture is iced to 5° C. and diazotized by the addition of 55 grams of a 40% solution of sodium nitrite. When the solution has become clear excess nitrous acid is reduced with sulfamic acid. This diazo is then added to a solution of 38 grams of 2 amino para cresol which has been dissolved in a mixture of 100 grams of 2 methyl 2 butanol and 100 grams of an aqueous solution containing 0.3 equivalents of naphthalene sulfonic acids to which 1 gram each of acrylic acid and butyl methacrylate have been added as free radical suppressors. Coupling proceeds quickly at 5–10° C. and is brought to completion by the addition of sufficient sodium acetate solution to raise the pH to 2.5. When the azo coupling is complete 150 grams of toluene and 55 grams of hydrochloric acid 32% is added to the reaction. 60 grams of a 40% solution of sodium nitrite is now added to diazotize the amino azo compound. When this reaction is complete 0.3 molar equivalents of a composition made by condensing 0.3 equivalents of 3 amino phenol and 0.6 equivalents of 2 ethyl hexyl glycidyl ether dissolved as an 80% solution in toluene is added to the system. Coupling proceeds readily with the formation of a magenta red bisazo dye. The coupling is now adjusted to pH 9 by the addition of aqueous ammonia and heated to 60° C. 0.3 molar equivalents of nickel chloride are now added to the system together with sufficient ammonia to stop the pH falling below 8.0. Formation of the metal complex is essentially instant as determined by TLC. 60 grams of 2 ethyl hexoxy propylamine is now added to the system and after a few minutes stirring agitation is stopped and the dye layer allowed to separate as an upper phase. The dye is then dried under vacuum to 110° C. and brought to a total weight of 700 grams with n-propanol. The product is a violet black with very good light fastness and solvent compatibility.

EXAMPLE 6

47.2 grams of 98% active 4 nitro 2 amino phenol is dissolved in 150 mls of cold water with 75 mls of hydrochloric acid 36%. The solution is now filtered to remove a small amount of insoluble material and then iced to 0° C. The solution is diazotized at 0–10° C. by the addition of 55 grams of a 40% solution of sodium nitrite which causes precipitation of the diazo in its quinone diazide configuration. After destroying excess nitrous acid with sulfamic acid a 50% solution of potassium carbonate is cautiously added to raise the pH of the system to 6.0. At this point a solution of 34 grams of Resorcinol (m-dihydroxybenzene or 1,3-dihydroxybenzene; molecular formula $C_6H_{6O2}$) dissolved in 100 mls of water is added. The mixture is then adjusted to pH 8.0 by the further addition of potassium carbonate solution. Coupling is very rapid and the monoazo compound starts to dissolve in the water, a process which is completed by the addition of 65 grams of a 45% solution of potassium hydroxide. To this solution is added the diazo prepared from 80 grams of para dodecyl aniline diazotized in the presence of 150 grams of xylene. As the bisazo coupling proceeds the dye produced emulsifies into the xylene phase. When the coupling is complete 0.3 molar equivalents of cupric acetate is added and the pH allowed to fall to 4.5. When TLC indicates that metallization is complete, the system is heated to 80° C. and allowed to separate. The upper organic dye phase is transferred to a drying flask and 25 grams of Diglycolamine (2-(2-Aminoethoxy)ethanol) is added. Entrained water is removed under vacuum together with organic solvents to ° C. The dye is diluted to a total of 400 grams with n-propanol and filtered. The product is a strong brown dye with very good light fastness.

EXAMPLE 7

Technical grade 44' diaminobenzanilide (23 grams) is suspended in 200 mL of stirred cold water. Next, 50 grams of hydrochloric acid 32% is added. The amine initially dissolves but then partially crystallizes as its dihydrochloride. The mixture is then cooled to 0–5° C. by the addition of ice and the diamine tetrazotized by the addition of 35 grams of a 40% sodium nitrite solution, while the temperature is kept below 10° C. by ice addition. After a short period of stirring, a clear solution of tetrazo is obtained. Any excess nitrite is reduced with a small amount of sulfamic acid after which a solution containing 0.1 moles of 2,5 dimethoxy aniline, prepared as in Example 1, is added. Azo coupling is rapid with only one of the diazonium groups on the tetrazotized 44' diamino benzanilide being reactive under these conditions. When coupling is finished, the aminoazo diazonium compound formed is added to a solution of 27.5 grams of parandodecylphenol dissolved in 150 mL of water with 15 grams of a 45% aqueous solution of potassium hydroxide. Additional alkali is added as necessary to keep the coupling pH at 11–12. After the reaction is completed, 200 grams of xylene is added followed by hydrochloric acid to reduce the pH to 5. The dye phase separates from the water most of which is removed and replaced by 150 mL of clean water. Next, 30 grams of hydrochloric acid is added followed by ice to adjust the temperature to 20–25° C. The aminodisazo is now diazotized by the addition of 19 grams of a 40% solution of sodium nitrite. Diazotization is complete after about 30 minutes when the excess nitrite is reduced with sulfamic acid after which a xylene solution containing 0.1 moles of 2(4' dodecylphenyl)amino naphthalene is added.

The reaction coupling proceeds rapidly with the formation of a dull greenish-blue dye that is separated and put into a reaction flask together with 0.1 gram mole of cupric hydrate together with 53 grams of 2 aminoethoxyethanol. As in Example 2, the process proceeds with the formation of a greenish black copperized trisazo dye. This dye has excellent solubility in most organic solvents and very good light and water fastness.

EXAMPLE 8

50 grams of 90% active 4 4 diamino diphenylamine sulfate is dissolved in 150 mls of cold water with 50 mls of hydrochloric acid 32%. The solution was iced to 5° C. and tetrazotized at this temperature by the addition of 55 grams of 40% sodium nitrite solution. When a clear pale yellow solution is obtained excess nitrous acid is reduced with sulfamic acid. To this diazo was added a pre-prepared solution of 25 grams 2,5 dimethoxyaniline dissolved in a mixture of 15 grams of nitric acid 70% and 50 mls of water, which was then cooled to 5° C. The coupling was stirred until the tetrazo diphenylamine could no longer be detected in the aqueous phase. 0.15 molar equivalents of essentially mono heptylated 2 naphthol dissolved in 200 mls of toluene was now added to the reaction. A 50% solution of sodium hydroxide was added dropwise until the pH reached 11, which brought the disazo coupling to completion. The pH of the system was then adjusted to 7 with hydrochloric acid, after which 75 mls of hydrochloric acid was added and the temperature adjusted to 20° C. 30 grams of a 40% solution of sodium nitrite was now added at 20–25° C. which rapidly diazotized the pendant amino group. A further 0.15 molar equivalents of heptylated beta naphthol was now added and the pH raised to 4.5 to produce a blackish navy trisazo dye, which separated into the upper organic phase. This was separated and put into a reaction flask. 50 grams of basic copper carbonate was now added, followed by 10 grams of 2 ethyl hexoic acid and 60 grams of 3 amino propyl diethylene glycol. The mixture was heated to 130° C. while water and solvent distilled out from the system. The cuprification was monitored by TLC, during which process the original dye was converted to a greenish black compound. At the end of the reaction all material volatile to 110° C. was stripped out under vacuum and the contents of the flask diluted with a equal weight of toluene. The product yielded an intense black shade at 5% solution in an MEK based inkjet ink. The prints from this ink had excellent light fastness and perfect water resistance.

EXAMPLE 9

0.2 moles of 4 amino N(3' propoxy ethoxyethoxy ethanol) benzene sulfonamide made by the condensation of aminopropoxy ethoxyethoxy ethanol with N acetylsulfanilyl chloride, followed by hydrolysis of the acetyl group, is diazotized and azo coupled to an equivalent amount of 2,5 dimethoxyaniline using the previously detailed techniques. The newly formed amino azo compound is then diazotized and coupled to 2(3' propylmorpholino)amino naphthalene. The resulting violet disazo dye is extracted under slightly basic conditions into a mixture of toluene and n-butanol. After separation from the aqueous phase, the compound is converted to its 1:1 copper complex using di 2 ethyl hexylamine as a ligand. The final dye product is a reddish-navy dye with good organic solvent solubility and relatively easy dispersability in water to form a stable microemulsion. When this is diluted and applied to paper it dries to a blue-black film completely resistant to water bleed.

EXAMPLE 10

A piece of light oak wood was stained with a 5% solution of the brown dyestuff detailed in example 6. After drying the wood now appeared like antique oak. Exposure of the wood in a Q Panel lightfastness tester made the sample pattern become darker rather than fading after extended exposure.

EXAMPLE 11

A simple permanent marker pen ink was formulated by mixing 20 grams of the unmetallized disazo dye synthesized in Example 2 with 10 grams of a 50% n-propanol solution of UNIREZ® 7019 (UNIREZ® is a registered trademark of Union-Camp Corporation) followed by 70 grams of n-propanol. A similar ink was then made of the finished cuprified dye. The two inks were loaded into individual permanent marker pens, which were used to draw adjoining parallel lines on white bond paper. After drying, the paper was exposed in a Q Panel Xenon arc lightfastness tester, according to the protocols of Method #16 of the American Association of Textile Chemists and Colorists. The unmetallized dye soon started to fade and accorded a lightfastness of 2 on the blue wool scale. The copper complex dye by comparison only started to break after a very extended exposure and qualified for a rating of 7–8.

EXAMPLE 12

A ballpoint pen ink based upon phenoxyethanol as a solvent was formulated containing 20% of the dye synthesized in Example 8. The ink was loaded into a ballpoint pen cartridge and placed in a Write machine. Two very popular brands of ballpoint pens were purchased and also put into the machine which was set to lay down parallel tracks of writing. Samples of the write-outs were exposed in a Q panel lightfastness tester which revealed that the inks in the purchased pens were very light fugitive because they were based upon the very popular C.I. Solvent Black 46. By contrast, the ink made from the dye obtained in Example 8 showed no loss of intensity even after the ink from the other pens was photo-faded colorless. In another experiment, an ink based largely upon C.I. Solvent Black 46 had 10% of its dye replaced by the dye from Example 8. Further write-outs were made and exposed. Even after the C.I. Solvent Black 46 had faded colorless, the write-out still retained legibility due to the presence of the copper complex dye.

EXAMPLE 13

The unsolvated dye produced in Example 2 (10 grams) was mixed with 4 grams of a light vegetable oil and 6 grams of the non ionic surfactant TRITON® X100 (TRITON® is a registered trademark of the Dow Corporation). The mixture was then added slowly to 200 mL of lightly stirred water in a disperser/blender. After a short period of blending, a uniform black dispersion was obtained. A sample of the dispersion was applied to brown kraft, board, which is typically used for packaging goods. An intense black coloration formed that had an excellent resistance to removal by water.

EXAMPLE 14

An n-propanol based industrial packaging ink jet ink was prepared from the dye synthesized in Example 2. This was compared with similar inks made from C.I. Solvent Blacks 29 and 48, hitherto "benchmark" products in this field. The light fading resistance of the inks containing the competitive dyes was noticeably inferior to that containing the dye of Example 2.

Numerous characteristics and advantages have been set forth in the foregoing description, together with details of structure and function. The novel features are pointed out in the appended claims. The disclosure, however, is illustrative only, and changes may be made in detail, within the principle of the invention, to the full extent indicated by the broad general meaning of the terms in which the appended claims are expressed.

What is claimed is:

1. A dye composition comprising a dye represented by the formula:

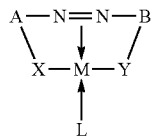

wherein A and B are one or more aromatic moieties bonded by one or more azo and hydroazo groups; M is a metal atom in a $2^+$ oxidation state; L is one or more water soluble primary and/or secondary aliphatic amines; and X and Y are independently one or more oxygen and/or nitrogen, wherein the dye composition comprises a non-ionic copper complexed azo dye.

2. The dye composition according to claim 1, wherein the aromatic moieties are selected from the group consisting of carbocyclic and heterocyclic moieties.

3. The dye composition according to claim 1, wherein the dye composition is soluble in an organic solvent.

4. The dye composition according to claim 3, wherein the organic solvent is selected from the group consisting of aliphatic hydrocarbons and lower alcohols.

5. The dye composition according to claim 1, wherein one or more of A or B is further substituted by a group selected from the group consisting of halogen, nitro, carbalkoxy, arylazo, sulfonamide, and substituted sulfonamide.

6. The dye composition according to claim 1, wherein L is hydrophilic.

7. The dye composition according to claim 1, wherein L is hydrophobic.

8. The dye composition according to claim 1, wherein L is selected from the group consisting of di-, tri-, and tetra-glycol amines, hydroxy ethoxy propylamines, ethylene amines, diethanolamine, glycol amines and more extensively ethoxylated homologues, hydroxyalkoxy propylamines, NN-dimethyl, diethyl amino propylamine, and NNNN-tetramethyl ethylene diamine.

9. A dye composition comprising a dye represented by the formula:

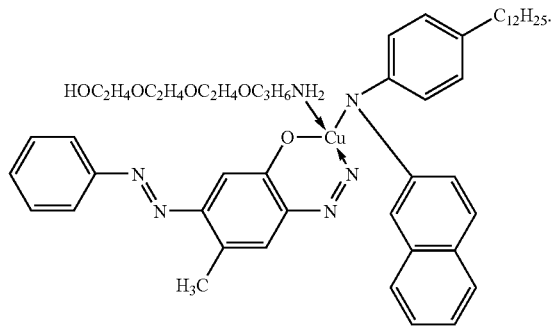

wherein A and B are one or more aromatic moieties bonded by one or more azo and hydroazo groups; M is a metal atom in a $2^+$ oxidation state; L is one or more water soluble primary and/or secondary aliphatic amines; and X and Y are independently one or more oxygen and/or nitrogen, further comprising one or more hydrocarbon chains containing at least 6 carbon atoms.

10. The dye composition according to claim 9, wherein the dye composition comprises a non-ionic copper complexed azo dye.

11. The dye composition according to claim 9, wherein the dye composition comprises a non-ionic nickel complexed azo dye.

12. The dye composition according to claim 9, wherein one or more of A or B is further substituted by a hydrocarbon chain containing from about 7 to about 24 carbon atoms.

13. A dye composition comprising a dye represented by the formula:

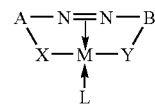

wherein A and B are one or more aromatic moieties bonded by one or more azo and hydroazo groups; M is a metal atom in a $2^+$ oxidation state; L is one or more water soluble primary and/or secondary aliphatic amines; and X and Y are independently one or more oxygen and/or nitrogen, wherein one or more of X and Y are nitrogen and the nitrogen is further substituted by an alkyl or aryl group.

14. A dye composition comprising a dye represented by the formula:

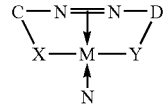

wherein C and D are one or more aromatic moieties bonded by one or more azo and hydroazo group and wherein one or more of C and D is substituted by a hydrophilic chain; M is a metal atom in a $2^+$ oxidation state; N is one or more water insoluble primary and/or secondary aliphatic amines; and X and Y are independently one or more oxygen and/or nitrogen.

15. The dye composition according to claim 14 wherein the hydrophilic chain is derived from a water soluble primary or secondary aliphatic amine or the condensation product of an aliphatic amine and ethylene oxide.

16. The dye composition according to claim 14 wherein one or more of C and D may further comprise other substituents selected from the group consisting of halogen, nitro, carbalkoxy, arylazo, sulfonamide and substituted sulfonamides.

17. The dye composition according to claim 14 wherein N comprises from about 7 to about 18 carbon atoms.

18. A dye composition comprising a dye represented by the formula:

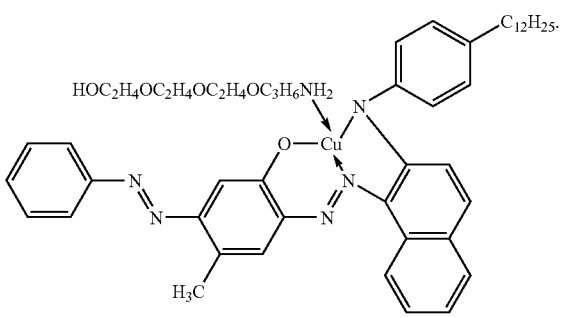

19. The dye composition according to claim 18, further comprising about 10% to about 80% of a compatible solvent.

20. The dye composition according to claim 19, wherein the solvent is selected from the group consisting of n-propanol, 2-butanone, toluene, phenol glycol ether, benzyl alcohol, and ethyl acetate.

* * * * *